US008565415B2

(12) United States Patent
Schmidt et al.

(10) Patent No.: US 8,565,415 B2
(45) Date of Patent: Oct. 22, 2013

(54) GAIN AND SPECTRAL SHAPE ADJUSTMENT IN AUDIO SIGNAL PROCESSING

(75) Inventors: Gerhard Uwe Schmidt, Ulm (DE); Bernd Iser, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 1383 days.

(21) Appl. No.: 12/246,994

(22) Filed: Oct. 7, 2008

(65) Prior Publication Data

US 2009/0225980 A1 Sep. 10, 2009

(30) Foreign Application Priority Data

Oct. 8, 2007 (EP) ..................................... 07019652

(51) Int. Cl.
*H04M 9/08* (2006.01)

(52) U.S. Cl.
USPC ..................... 379/406.03; 379/390.03; 381/92

(58) Field of Classification Search
USPC ........... 379/406.01–406.02, 406.08; 270/288; 708/304; 381/71.1, 71.11, 92, 93, 66
See application file for complete search history.

(56) References Cited

U.S. PATENT DOCUMENTS

| 5,668,794 | A | * | 9/1997 | McCaslin et al. | ............. | 370/288 |
| 5,859,914 | A | * | 1/1999 | Ono et al. | ........................ | 381/66 |
| 7,373,367 | B2 | * | 5/2008 | Lee et al. | ....................... | 708/300 |
| 7,532,717 | B2 | * | 5/2009 | Nishimura | ............... | 379/406.01 |
| 2007/0041575 | A1 | * | 2/2007 | Alves et al. | .............. | 379/406.08 |

FOREIGN PATENT DOCUMENTS

| DE | 101 41 493 A1 | 3/2003 |
| EP | 0204718 B1 | 12/1986 |
| EP | 1020068 B1 | 7/2000 |
| EP | 1 677 431 A | 7/2006 |
| JP | 2000 190785 A | 7/2000 |
| WO | WO 96/26592 | 8/1996 |

OTHER PUBLICATIONS

Täger, W., "Etudes en traitement d'antenne pour la prise de son," [Online] Oct. 28, 1998, pp. 79-88.
Brandstein, M., Ward, D., Eds. "Microphone Arrays—Signal Processing Techniques and Applications", Springer-Verlag Berlin Heidelberg New York 2001, pp. 19-32.
Herbordt, W. and Kellerman, W., "Adaptive beamforming for audio signal acquisition," in "Adaptive signal processing: applications to real-world problems", p. 155, Springer, Berlin 2003.
Hänsler, E. and Schmidt, G., "Acoustic Echo and Noise Control—A Practical Approach," John Wiley & Sons, New York, 2004.

* cited by examiner

*Primary Examiner* — Mohammad Islam
*Assistant Examiner* — Van D Huynh
(74) *Attorney, Agent, or Firm* — Sunstein Kann Murphy & Timbers LLP

(57) ABSTRACT

A signal processing system enhances communication. When an audio signal is detected, an echo component of the detected audio signal may be estimated. A near party communication device may receive an audio signal from a remote party communication device. A characteristic of the received audio signal may be adjusted based on the echo component of the detected audio signal.

22 Claims, 9 Drawing Sheets

GAIN AND SPECTRAL SHAPE ADJUSTMENT IN AUDIO SIGNAL PROCESSING

BACKGROUND OF THE INVENTION

1. Priority Claim

This application claims the benefit of priority from European Patent Application No. 07019652.2, filed Oct. 8, 2007, which is incorporated by reference.

2. Technical Field

This application relates to signal processing and, more particularly, to adjusting the gain or spectral shape of audio signals.

3. Related Art

Audio communication systems may operate in noisy environments. Noise may interfere with some audio communication systems, such as hands-free voice communication systems. A hands-free voice communication system may include a microphone to detect near party utterances and a loudspeaker to output utterances received from a remote party. Noise may reduce the quality of the near party utterances detected by the system microphone. Furthermore, noise may make it more difficult for the near party to hear or understand the remote party utterances output from the system loudspeaker.

Some audio communication systems may be susceptible to echo. In a hands-free voice communication system, echo may occur when the system microphone detects the remote party utterances from the system loudspeaker. Echo may reduce the quality of a communication when the remote party utterances are detected by the system microphone and transmitted back to the remote party.

To increase the quality of these communications, audio communication systems may process the detected audio signals to remove noise and/or echo components. Although this processing may enhance the detected audio signals, it may not compensate for some types of noise or echo interference. Therefore, a need exists for an improved way to process audio signals to compensate for noise and echo.

SUMMARY

A signal processing system enhances communication. When an audio signal is detected, an echo component of the detected audio signal may be estimated. A near party communication device may receive an audio signal from a remote party communication device. A characteristic of the received audio signal may be adjusted based on the echo component of the detected audio signal.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A signal processing system may enhance communication by adjusting a received audio signal based on features of a detected audio signal. The system may adjust a characteristic of a received audio signal based on an estimated echo component of a detected audio signal. Alternatively, the system may adjust a characteristic of a received audio signal based on an estimated echo component and an estimated noise component of a detected audio signal.

Figure 1:
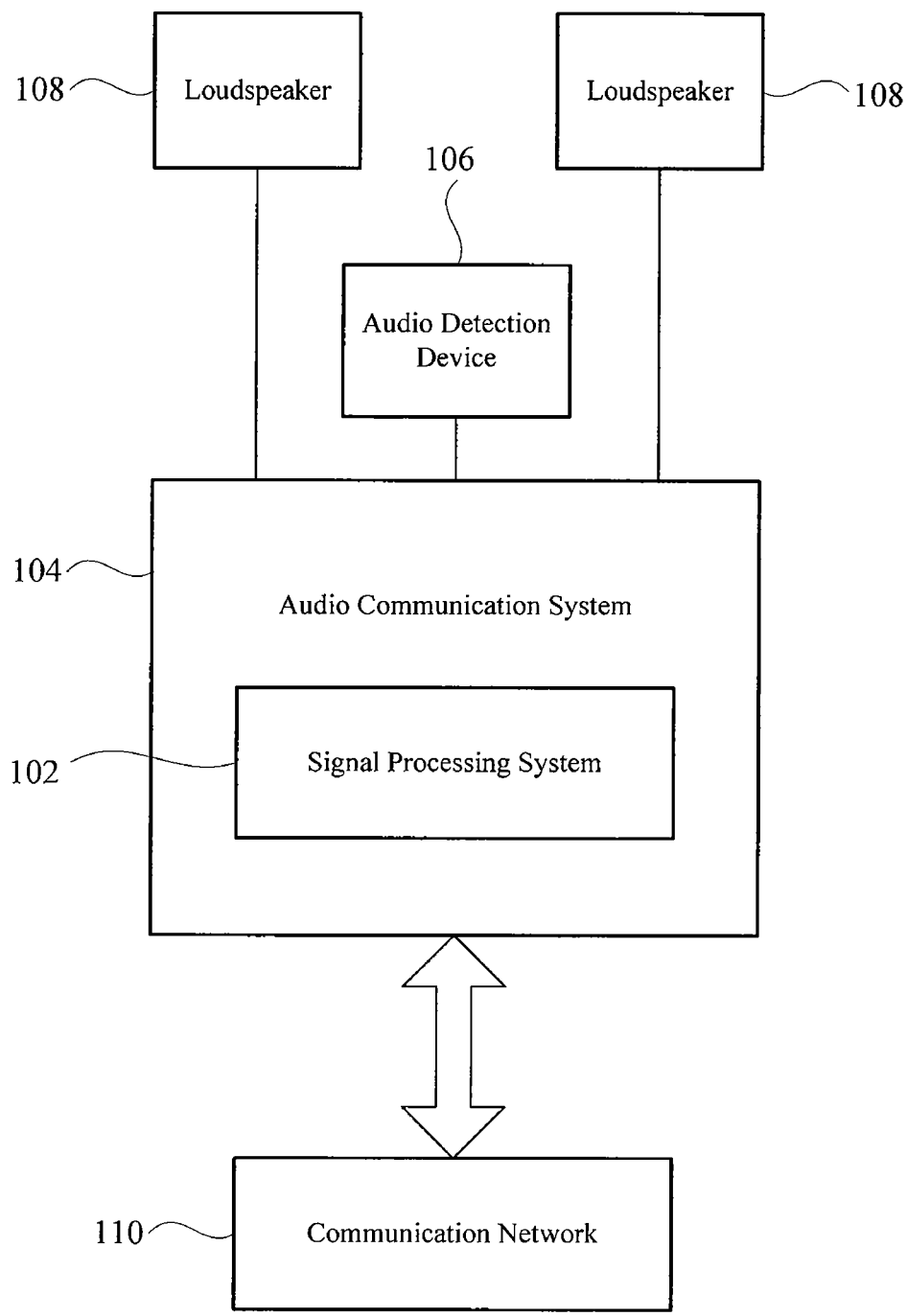
FIG. 1 is a signal processing system.

FIG. 1 shows a signal processing system 102 in communication with an audio communication system 104. The audio communication system 104 may be a hands-free voice communication system or other audio system. The audio communication system 104 may be located within a room, vehicle compartment, or other space. An audio detection device 106 may interface with the audio communication system 104. The audio detection device 106 may include one or more microphones or other devices that detect audio signals and transmit the detected signals to the audio communication system 104 for processing. The audio communication system 104 may also interface with one or more loudspeakers 108. The loudspeakers 108 may receive audio signals from the audio communication system 104 and make those signals audible for users in a vicinity of the loudspeakers 108.

In some implementations, the audio communication system 104 interfaces with a communication network 110. The audio communication system 104 may transmit or receive audio signals across a physical or wireless medium of the communication network 110 to one or more other communication systems. A user may participate in a voice conversation with a remote party through the communication network 110. The communication network 110 may transmit audio signals between a near party communication device (e.g., a device associated with the user of the communication system 104) and a remote party communication device (e.g., a device associated with a user of a remote communication system). The audio detection device 106 may detect speech from the near party, and the loudspeakers 108 may transmit speech received from the remote party.

The audio communication system 104 may operate in a noisy environment. The noise may include background noise, echo, or other interference. Echo may occur when the audio detection device 106 picks up an audio signal output from the loudspeakers 108. The audio communication system 104 may use the signal processing system 102 to adjust a received audio signal based on features of a detected audio signal. By adjusting the received audio signal, the signal processing system 102 may compensate for some effects of the noise or echo interference. The signal processing system 102 may maintain the signal-to-noise ratio (SNR) at a relatively constant level (and at a high level) in the vicinity of a local user/speaker at the near party communication device. The signal processing system 102 may improve both highly time varying local background noise (e.g., noise caused by changing driving speeds or road pavements), and changing signal level (e.g., signal power) of the received signals from a remote party communication device.

Figure 2:
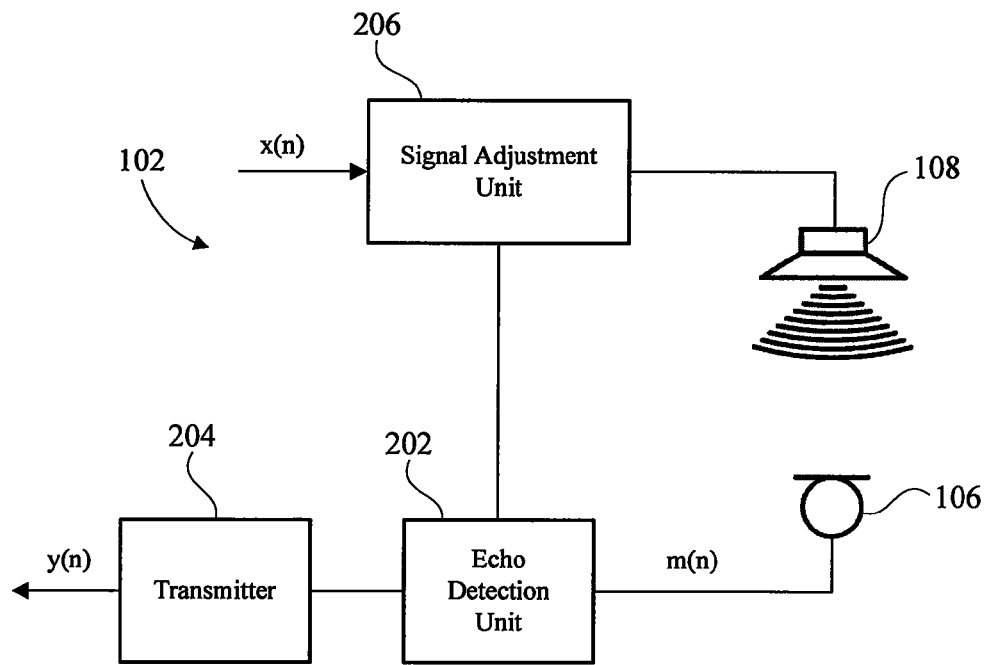
FIGS. 2-4 are alternative signal processing systems.

FIG. 2 illustrates one implementation of the signal processing system 102. In FIG. 2, the signal processing system 102 may receive an audio signal x(n) from a remote party communication device. The received audio signal x(n) may include content from a telephone conversation between a remote party communication device and a near party communication device. The received audio signal x(n) may be speech from the remote party. The near party may use a hands-free set that includes microphone 106 and a loudspeaker 108. The communication system may convert the signal x(n) into an audible range through the loudspeaker 108.

The microphone 106 may detect an audio signal m(n). The detected audio signal m(n) may be a microphone signal. Although the microphone 106 may be tuned to detect a speech signal of the near party, the microphone 106 may also detect an echo contribution caused by the output of the loudspeaker 108. Therefore, the detected audio signal m(n) may include a near party speech component and an echo component.

The detected audio signal m(n) may be transmitted to an echo detection unit 202. The echo detection unit 202 estimates the echo component of the detected audio signal m(n). Specifically, the echo detection unit 202 may analyze the detected audio signal m(n) to identify a portion of the detected audio signal m(n) that is due to the loudspeaker 108 outputting an audio signal received from the remote party communication device.

The echo detection unit 202 may attenuate the echo component of the detected audio signal m(n). The echo detection unit 202 may comprise an echo compensation filter to attenuate echo components of the detected audio signal m(n). The echo detection unit 202 passes the detected audio signal m(n), either with or without echo compensation, to a transmitter 204. The transmitter 204 sends the detected audio signal m(n) to the remote party communication device involved in the conversation with the near party.

The echo detection unit 202 outputs an estimated echo component to a signal adjustment unit 206. The signal adjustment unit 206 may adjust one or more characteristics of the received audio signal x(n) based on the estimated echo component of the detected audio signal m(n). The adjusted version of the received audio signal x(n) may be transmitted to the loudspeaker 108 to be output to the near party user.

The signal adjustment unit 206 may adjust a gain of the received audio signal x(n) based on the estimated echo component of the detected audio signal m(n). In another application, the signal adjustment unit 206 may adjust a spectral shape of the received audio signal x(n) based on the estimated echo component of the detected audio signal m(n). In yet another application, the signal adjustment unit 206 may adjust the gain and spectral shape of the received audio signal x(n) based on the estimated echo component of the detected audio signal m(n). In other applications, the signal adjustment unit 206 may adjust some other characteristic of the received audio signal x(n) based on the estimated echo component of the detected audio signal m(n).

Figure 3:
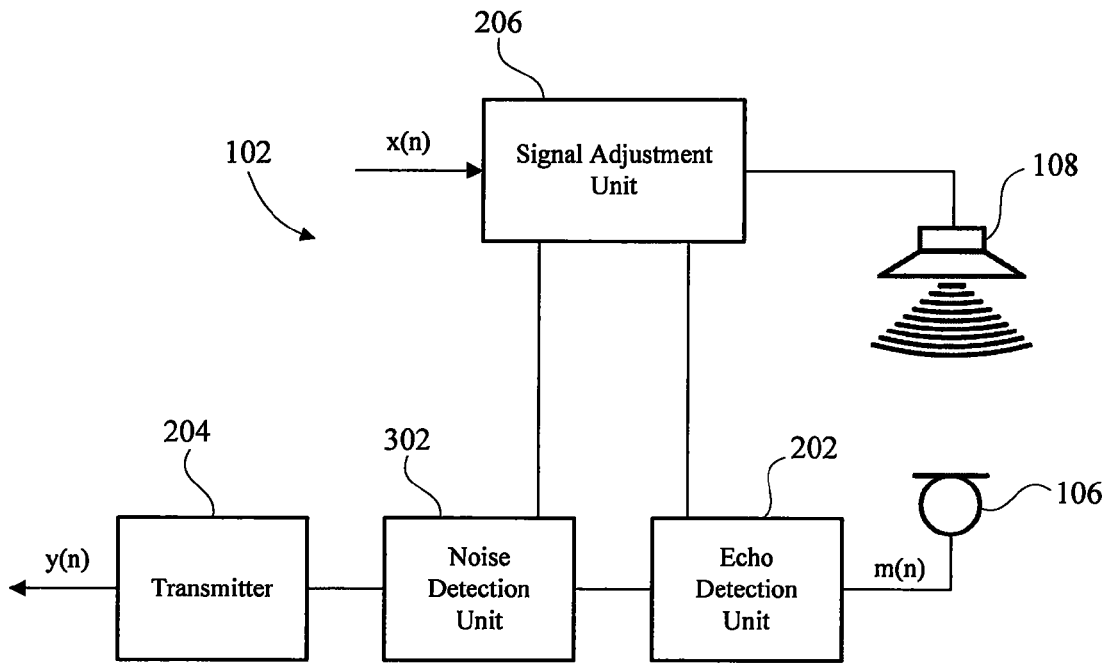

FIG. 3 is an alternative signal processing system 102. The signal processing system 102 of FIG. 3 includes a noise detection unit 302 and the echo detection unit 202. Besides the desired near party speech, the microphone 106 may detect echo and background noise. The detected audio signal m(n) may include a near party speech component, an echo component, and a noise component. The echo component may be local acoustic echo experienced at the near party communication device and the noise component may be local background noise experienced at the near party communication device.

The echo detection unit 202 outputs an estimated echo component of the detected audio signal m(n) to the signal adjustment unit 206. The noise detection unit 302 estimates and outputs a noise component of the detected audio signal m(n). Specifically, the noise detection unit 302 may analyze the detected audio signal m(n) to identify a portion of the detected audio signal m(n) that is due to background noise.

The signal adjustment unit 206 receives an estimate of the noise component in the detected audio signal m(n) and an estimate of the echo component in the detected audio signal m(n). The signal adjustment unit 206 may adjust one or more characteristics of the received audio signal x(n) based on the estimated noise component and the estimated echo component. The signal adjustment unit 206 may adjust a gain of the received audio signal x(n) based on the estimated noise component and the estimated echo component of the detected audio signal m(n). In another application, the signal adjustment unit 206 may adjust a spectral shape of the received audio signal x(n) based on the estimated noise component and the estimated echo component of the detected audio signal m(n). In yet another application, the signal adjustment unit 206 may adjust the gain and spectral shape of the received audio signal x(n) based on the estimated noise component and the estimated echo component of the detected audio signal m(n). In other applications, the signal adjustment unit 206 may adjust some other characteristic of the received audio signal x(n) based on the estimated noise component and the estimated echo component of the detected audio signal m(n).

Figure 4:
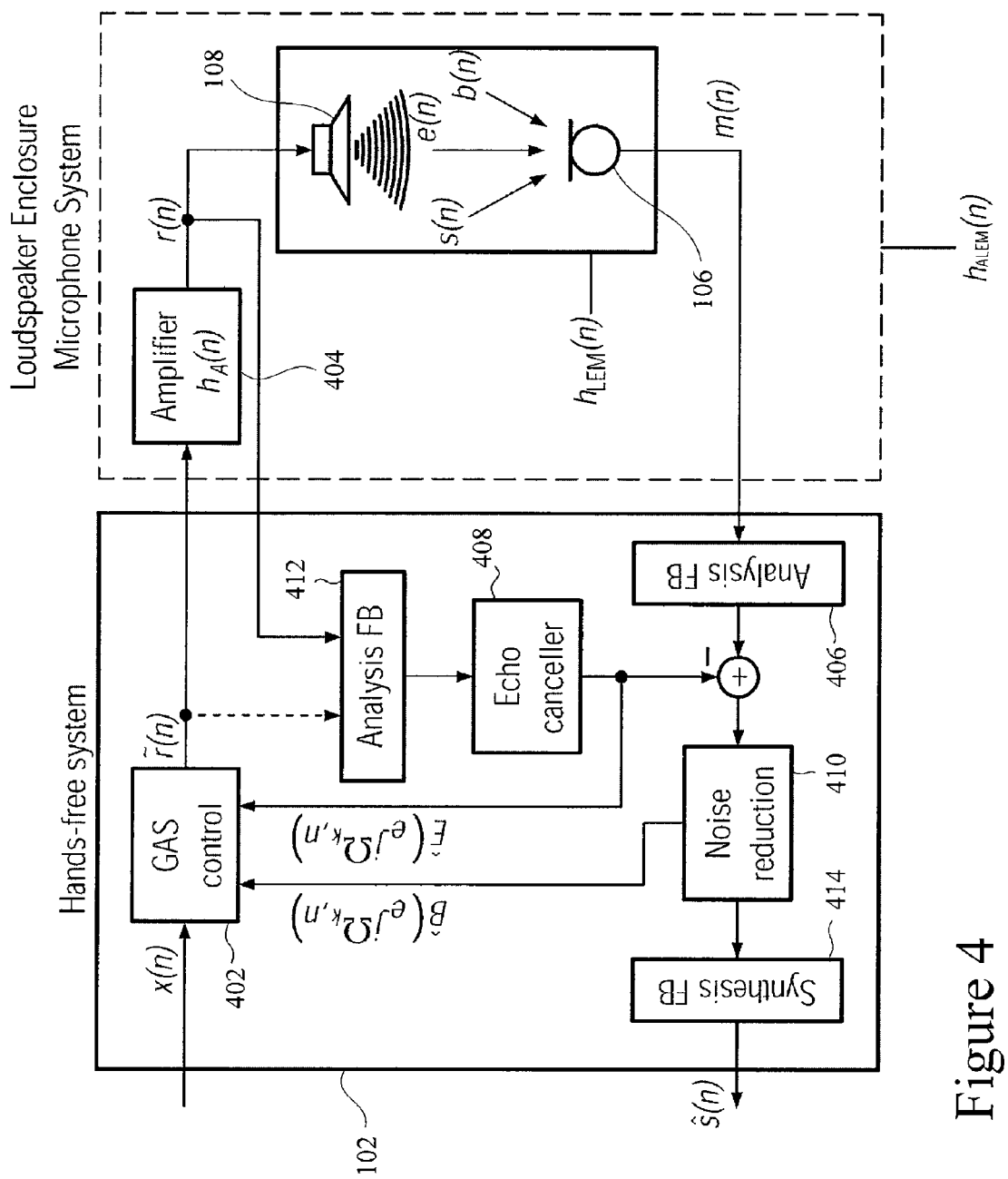

FIG. 4 is another alternative signal processing system 102. The signal processing system 102 may include a hands-free communication system. The signal processing system 102 of FIG. 4 includes a gain and shape (GAS) control unit 402. The GAS control unit 402 receives a speech signal x(n) that was transmitted from a remote party communication device and received by the near party communication device. The GAS control unit 402 may enhance the quality of the received signal x(n) by gain and shape processing. The GAS control unit 402 outputs an enhanced speech signal $\tilde{r}(n)$ to an amplifier 404. The amplifier 404 generates an amplified signal r(n) which is then output from a loudspeaker 108.

The near party, the loudspeaker 108, and the microphone 106 may be positioned within an enclosure (e.g., an room, a vehicle compartment, or other space). The enclosure may be part of a loudspeaker-enclosure-microphone (LEM) system. The LEM system may be characterized by an impulse response $h_{LEM}(n)$. Although the microphone 106 of the LEM system may be tuned to detect a speech signal s(n) of the near party, the microphone may also detect background noise b(n) and an echo contribution e(n) caused by the output of the loudspeaker 108. The audio signal m(n) generated by the microphone 106 may be represented as m(n)=s(n)+b(n)+e(n). In one implementation, the microphone 106 may be a directional microphone of a microphone array that outputs microphone signals to a beamformer that produces beamformed microphone signals.

In FIG. 4, the audio signal m(n) detected by the microphone 106 is processed in a sub-band regime. In other systems, the audio signal m(n) may be processed in the frequency domain. For systems that process the audio signal m(n) in the sub-band regime, the signal processing system 102 includes an analysis filter bank 406 to divide the audio signal m(n) into multiple sub-bands. The analysis filter bank 406 may comprise Hann or Hamming windows.

The signal processing system 102 of FIG. 4 includes an echo compensation filter 408 and a noise reduction filter 410. The echo compensation filter 408 estimates an echo component of the audio signal m(n). The noise reduction filter 410 estimates a noise component of the audio signal m(n). The echo compensation filter 408 and the noise reduction filter 410 output the echo and noise estimates to the GAS control unit 402. The echo compensation filter 408 may output a frequency selected estimate of the echo component $\hat{E}(e^{j\Omega_k}, n)$, where $\Omega_k$ denotes the frequency sub-band and n denotes the discrete time index. The noise reduction filter 410 may output the square-root of the estimated short-term spectral power density $\hat{B}(e^{j\Omega_k}, n)$ of the noise present in the microphone signal m(n). The noise reduction filter 410 may be a Wiener filter.

The GAS control unit 402 processes the noise and echo estimates to produce an enhanced speech signal $\tilde{r}(n)$. The enhanced speech signal $\tilde{r}(n)$ is transmitted from the GAS control unit 402 to the amplifier 404 and loudspeaker 108. The GAS control unit 402 may process the received signal x(n) to obtain the enhanced speech signal $\tilde{r}(n)$. The GAS control unit 402 may increase a level of intelligibility in the communication system.

The echo compensation filter 408 may attenuate the echo components of the microphone signal m(n). The echo compensation filter 408 may be a linear or non-linear adaptive filter where a replica of the acoustic feedback may be synthesized. The filter may generate a compensation signal from a received signal (e.g., a reference signal). The compensation signal may be subtracted from the microphone signal m(n) to generate an enhanced signal that may be sent to the remote party. The echo estimation may be based on a reference signal obtained from the received signal before or after amplification.

In some systems, the filter coefficients of the echo compensation filter 408 are adapted to model the impulse response $h_{LEM}(n)$ of the LEM system. In these systems, the signal r(n) may be input as a reference signal to the echo compensation filter 408 to adapt the filter coefficients of the echo compensation filter 408 (e.g., e(n)=r(n)*$h_{LEM}(n)$).

In other systems, the signal $\tilde{r}(n)$ output by the GAS control unit 402 (e.g., before amplification by the amplifier 404) may be sent to the echo compensation filter 408 for adaptation of the filter coefficients. In these systems, the echo compensation filter 408 may perform two convolutions of time-dependent systems. One convolution may be for the impulse (frequency) response $h_A(n)$ of the amplifier 404 and the other convolution may be for the impulse response $h_{LEM}(n)$ of the LEM system. The echo compensation filter 408 may model a combined impulse response $h_{ALEM}(n)$, e(n)=$\tilde{r}(n)$*$h_{ALEM}(n)$.

The reference signal for echo compensation may be processed in the sub-band regime in some systems. Either of the reference signals r(n) and $\tilde{r}(n)$ may be processed by an analysis filter bank 412 to divide the reference signal into multiple reference signal sub-bands. The analysis filter bank 412 may be similar to the analysis filter bank 406. The analysis filter bank 412 may comprise Hann or Hamming windows. The reference signals processed by the analysis filter bank 412 may be used to adapt the filter coefficients of the echo compensation filter 408. The outputs of the echo compensation filter 408 may be used to attenuate echo components in the microphone signal m(n).

The noise reduction filter 410 may receive the echo compensated versions of the sub-bands of the microphone signal m(n). The noise reduction filter 410 may attenuate noise components in the microphone signal m(n). The outputs of the noise reduction filter are passed to a synthesis filter bank 414. The synthesis filter bank 414 may comprise Hann or Hamming windows. The synthesis filter bank 414 synthesizes the noise and echo filtered microphone sub-band signals to obtain an enhanced signal $\hat{s}(n)$. A transmitter may transmit the enhanced signal $\hat{s}(n)$ to a remote party communication device involved in the communication with the near party communication device.

Figure 5:
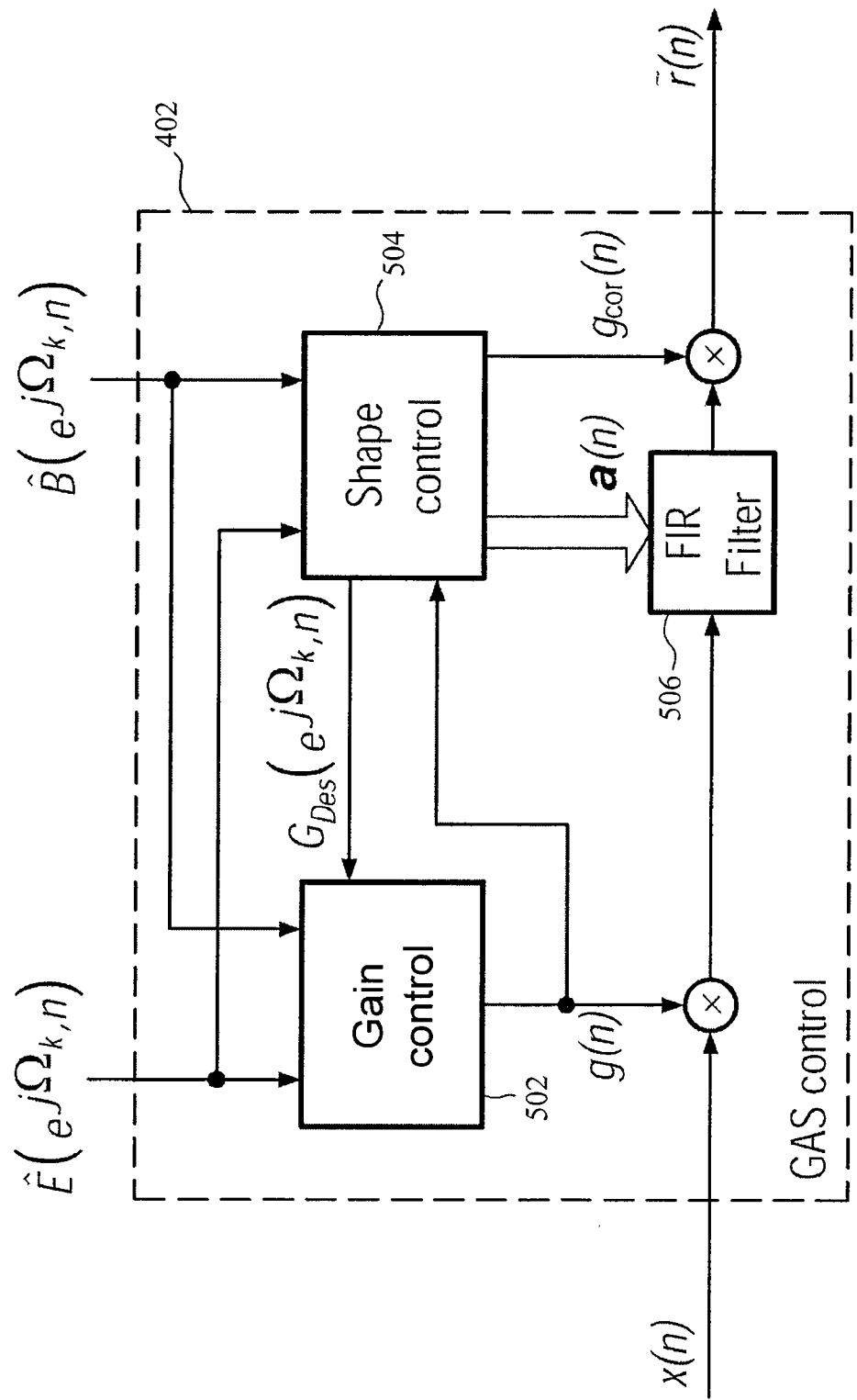
FIG. 5 is a gain and shape control unit.

FIG. 5 shows the GAS control unit 402. The GAS control unit 402 may comprise a gain control unit 502 and a shape control unit 504. In the implementation of FIG. 5, the gain and/or the spectral shape of the received signal x(n) may be changed to improve the quality of the signal transmitted by a remote party.

Figure 6:
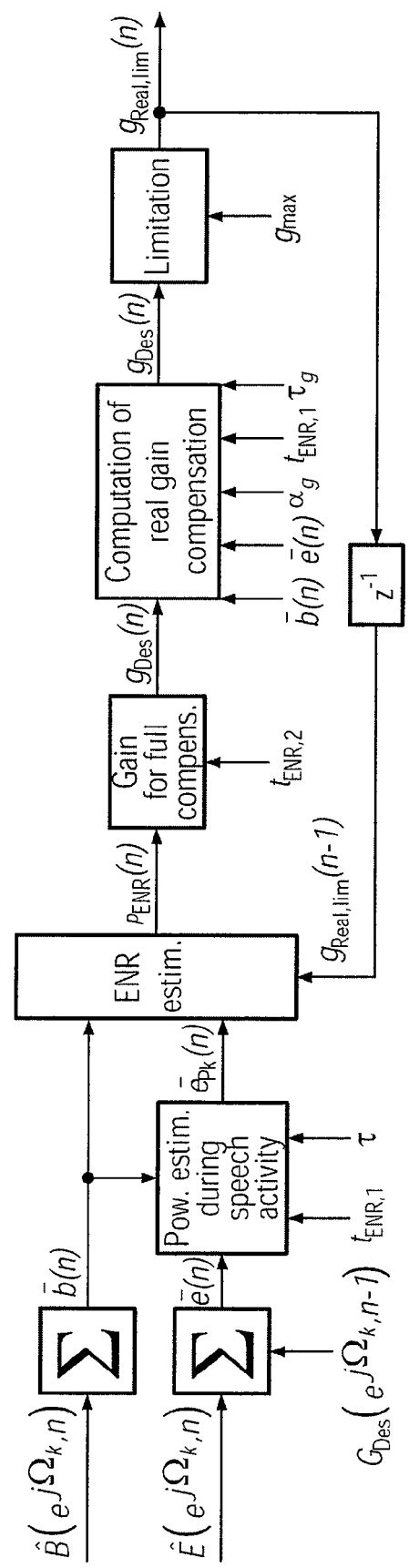
FIG. 6 is a gain process.

The gain may be controlled based on estimates of both noise and acoustic echo that are present in the microphone signal m(n). The spectral estimates $\hat{E}(e^{j\Omega_k}, n)$ and $\hat{B}(e^{j\Omega_k}, n)$ obtained by the echo compensation filter 408 and the noise reduction filter 410, respectively, may be summed up and averaged (see also FIG. 6 illustrating one implementation of the gain control unit 502 in more detail) as follows:

$$\bar{b}(n) = \frac{1}{\frac{N_{FFT}}{2}+1} \sum_{k=0}^{N_{FFT}/2} |\hat{B}(e^{j\Omega_k}, n)|,$$

where $N_{FFT}$ denotes the order of the FFT (number of interpolation points).

In some applications, the system may perform gain and shape control. In other applications, the system may perform gain control or shape control. In applications where the shape control unit 504 may not be active, the summed up and averaged spectral estimates for the echo $\bar{e}(n)$ in FIG. 6 may be determined as follows:

$$\bar{e}(n) = \frac{1}{\frac{N_{FFT}}{2}+1} \sum_{k=0}^{N_{FFT}/2} |\hat{E}(e^{j\Omega_k}, n)|.$$

In the situation where both the gain control unit 502 and the shape control unit 504 are active, the above expression for the averaged estimate for the echo may be expressed by the following:

$$\bar{e}(n) = \frac{1}{\frac{N_{FFT}}{2}+1} \sum_{k=0}^{N_{FFT}/2} \frac{|\hat{E}(e^{j\Omega_k}, n)|}{G_{Des}(e^{j\Omega_k}, n)},$$

where $G_{Des}(e^{j\Omega_k}, n)$ represents the desired gain that is output by the shape control unit 504. Independent functionality of the gain control unit 502 and the shape control unit 504 may be established when both are active.

Depending on the application, it may be sufficient to use only some portion of the entire bandwidth and, thus, the summation may be shortened (<$N_{FFT}/2$). In some implementations, the normalization factor before the summations is used. In other implementations, the normalization factor before the summations is not used.

The gain control unit 502 may determine an average peak echo level $\bar{e}_{Pk}(n)$ by smoothing whenever a predetermined echo-to-noise (ENR) threshold ($t_{ENR,1}$) is exceeded (see FIG. 6):

$$\bar{e}_{Pk}(n) = \begin{cases} \tau \bar{e}(n) + (1-\tau)\bar{e}_{Pk}(n-1), & \text{if } \frac{\bar{e}(n)}{\bar{b}(n)} > t_{ENR,1} \\ \bar{e}_{Pk}(n-1), & \text{otherwise} \end{cases}$$

where the smoothing constant may be chosen as $0<\tau\ll 1$. Other methods of smoothing may be used, such as by multiplication by two different time constants for falling and increasing echo power, respectively. Smoothing may avoid the generation of artifacts due to outliers and/or annoying abrupt adjustment results. In some implementations, values out of the interval [2, 10] for $t_{ENR,1}$ may be used.

In FIG. 6, the average peak ENR may be determined by:

$$p_{ENR}(n) = \frac{\bar{e}_{Pk}(n)}{\bar{b}(n)g_{Real,lim}(n-1) + \varepsilon}$$

where $p_{ENR}(n)$ may be compensated for the gain introduced by the gain control unit 502 $g_{Real,lim}(n-1)$ and the small constant $\varepsilon\ll 1$ may be added in the denominator to avoid division by zero.

A desired gain $g_{Des}(n)$ for establishing a constant ENR level ($t_{ENR,2}$) in order to improve the intelligibility of the received speech signal x(n) may be determined by:

$$g_{Des}(n) = \begin{cases} \frac{t_{ENR,2}}{p_{ENR}(n)}, & \text{if } p_{ENR}(n) < t_{ENR,2} \\ 1, & \text{otherwise} \end{cases}$$

In some implementations, values out of the interval [4, 30] for $t_{ENR,2}$ may be used. A preliminary gain may thus be determined by the gain control unit 502 as follows:

$$g_{Real}(n) = \begin{cases} g_{Real}(n-1)\tau_{g,rise}, \\ \quad \text{for } (1-\alpha_g)g^2_{Real}(n-1) + \alpha_g g_{Real}(n-1) \le g_{Des}(n) \text{ and } \frac{\bar{e}(n)}{\bar{b}(n)} > t_{ENR,1}, \\ g_{real}(n-1)\tau_{g,fall}, \\ \quad \text{for } (1-\alpha_g)g^2_{Real}(n-1) + \alpha_g g_{Real}(n-1) > g_{Des}(n) \text{ and } \frac{\bar{e}(n)}{\bar{b}(n)} > t_{ENR,1}, \\ g_{Real}(n-1), \text{ otherwise} \end{cases}$$

where the characteristic may be adjusted by the positive real parameter $\alpha_g<1$. The increment and decrement parameters $\tau_{g,rise}$ and $\tau_{g,fall}$ may satisfy:

$$0\ll\tau_{g,fall}<1<\tau_{g,rise}\ll\alpha.$$

The preliminary gain may be adjusted ranging from merely compensating the current signal-to-noise ratio up to the predetermined limit of $t_{ENR,2}$ and may be limited to a maximum allowable gain $g_{max}$ (see FIG. 6):

$$g_{Real,lim}(n) = \min\{g_{max}, g_{Real}(n)\}.$$

If the shape control unit 504 of FIG. 5 is not active, an enhanced signal $\tilde{r}(n)=\tilde{r}_{Gain}(n)=g_{Real,lim}(n)x(n)$ may be obtained. By the processing described above, the gain increases as time-dependent noise increases and also when the background noise is almost stationary but the speech power of a remote speaker decreases (thereby realizing an automatic gain control).

In FIG. 5, shaping of the received audio signal x(n) may be performed by a Finite Impulse Response (FIR) filter 506 controlled by the shape control unit 504. In alternative systems, an Infinite Impulse Response (IIR) filter may be used in place of the FIR filter 506.

Figure 7:
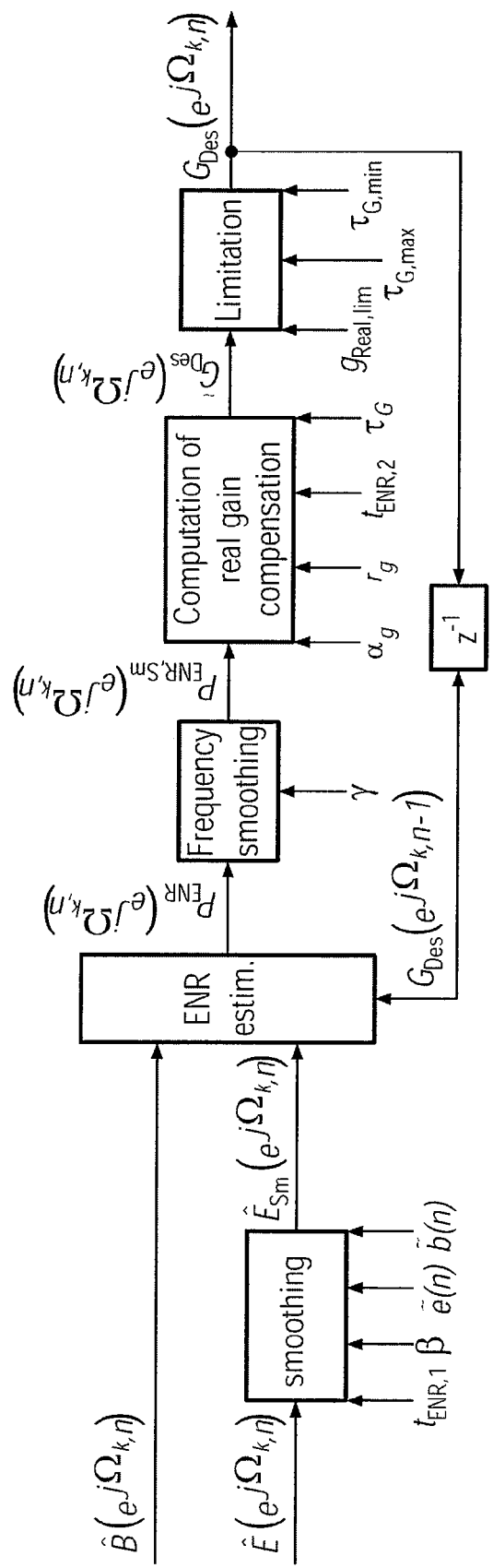
FIG. 7 is a gain and spectral shaping process.

FIG. 7 illustrates an operation of the shape control unit 504. An average peak echo level may be determined by the shape control unit 504 by smoothing the estimated echo spectrum provided by the echo compensation filter 408 of FIG. 4 each time a predetermined ENR threshold ($t_{ENR,1}$) is exceeded similar to the above-described determination by the gain control unit 502 but for each frequency bin:

$$\hat{E}_{Sm}(e^{j\Omega_k},n) = \begin{cases} \beta|\hat{E}(e^{j\Omega_k},n)| + (1-\beta)\hat{E}_{Sm}(e^{j\Omega_k},n-1), & \text{if } \frac{\bar{e}(n)}{\bar{b}(n)} > t_{ENR,1} \\ \hat{E}_{Sm}(e^{j\Omega_k},n-1) \end{cases}$$

with $0<\beta\ll 1$. Thus, a spectral average peak ENR is obtained:

$$P_{ENR}(e^{j\Omega_k},n) = \frac{\hat{E}_{Sm}(e^{j\Omega_k},n)}{|\hat{B}(e^{j\Omega_k},n)|G_{Des}(e^{j\Omega_k},n) + \varepsilon}.$$

The spectral average peak ENR may be smoothed in the positive and negative frequency directions to obtain a smoothed spectral average peak ENR, e.g., $P_{ENR,Sm}(e^{j\Omega_k},n)$. The smoothing may be performed by a first order IIR filter. The desired gain vector may be obtained by (see FIG. 7):

$$\tilde{G}_{Des}(e^{j\Omega_k},n) = \begin{cases} G_{Des}(e^{j\Omega_k},n-1)\tau_g, \text{ if } ((1-\alpha_s)G^2_{Des}(e^{j\Omega_k}, \\ \quad n-1) + \alpha_s G_{Des}(e^{j\Omega_k},n-1)) \\ \quad P_{ENR,Sm}(e^{j\Omega_k},n) > t_{ENR,2} \\ G_{Des}(e^{j\Omega_k},n-1)\tau_G, \text{ otherwise.} \end{cases}$$

with $0<\alpha_s<1$ and $0\ll\tau_g<1<\tau_G\ll\alpha_s$.

After limitation of the desired gain in the directions of the maximum gain and maximum attenuation, respectively, the desired gain may be obtained by:

$$G_{Des}(e^{j\Omega_k},n) = \min\{\tau_{G,max}(n), \max\{\tau_{G,min}(n), \tilde{G}_{Des}(e^{j\Omega_k},n)\}\}$$

where $\tau_{G,max}(n)$ and $\tau_{G,min}(n)$ depend on the gain $g_{Real,lim}(n)$ computed by the gain control unit 502. If only a small gain is introduced by the gain control unit 502 (or no gain at all), only a small gain is introduced by the shape control unit 504 (or no gain at all). A significant gain introduced by the gain control unit 502, on the other hand, may result in a significant gain introduced by the shape control unit 504 (see also FIG. 7).

In FIG. 5, the signal $\tilde{r}_{Gain}(n)$ obtained by processing the received speech signal x(n) by the gain control unit 502 may be shaped. In one implementation, Discrete Fourier Transformations (DFT)/Inverse Discrete Fourier Transformations (IDFT) and $N_{DFT}$ multiplications for each frequency bin in the frequency domain may used for shaping. In other implementations, the DFT/IDFT processing may be avoided. For this purpose, a low order FIR filter 506 may be used. The delay introduced by the FIR filter may be lower than the one that would be introduced by DFT/IDFT processing of $\tilde{r}_{Gain}(n)$.

The inverse of the squared magnitude of the desired spectral shape correction may be transformed into the time domain, as follows:

$$a_{Des}(n) = IDFT\left\{\frac{1}{|G_{Des}(e^{j\Omega_k}, n)|^2}\right\}$$

with the vector containing the auto correlation coefficients $a_{DES,i}(n)$:

$$a_{Des}(n) = [a_{Des,0}(n), a_{Des,1}(n), \ldots, a_{Des,N_{DFT}-1}(n)]^T$$

where $N_{DFT}$ denotes the order of the DFT. This vector may be shortened to the order of the desired FIR filter $(N_{FIR})+1$:

$$a_{Des,mod}(n) = [a_{Des,mod,0}(n), a_{Des,mod,1}(n), \ldots, a_{Des,mod,N_{FIR}}(n)]^T$$

by $$a_{Des,mod}(n) = W_{cut} a_{Des}(n)$$

with $$W_{cut} = \begin{bmatrix} w_{0,0} & 0 & \cdots & 0 & 0 & \cdots & 0 \\ 0 & w_{1,1} & \cdots & 0 & 0 & \cdots & 0 \\ \vdots & \vdots & \ddots & \vdots & \vdots & & \vdots \\ 0 & 0 & \cdots & w_{N_{FIR},N_{FIR}} & 0 & \cdots & 0 \end{bmatrix}.$$

The elements of the matrix $W_{cut}$ may be given by:

$$w_{i,i} = 1 \text{ for } i \in \{0, \ldots, N_{FIR}\}.$$

The vector of the filter coefficients $a(n)$ of the FIR filter 506

$$a(n) = [a_0(n), a_1(n), \ldots, a_{N_{FIR}-1}(n)]^T$$

are determined by the shape control unit 504 to reproduce the shape $G_{des}(e^{j\Omega k}, n)$. For this purpose, the following vector equation may be solved:

$$a(n) = A_{Des,mod}^{-1}(n) \tilde{a}_{Des,mod}(n)$$

with $$A_{Des,mod}(n) = \begin{bmatrix} a_{Des,mod,0}(n) & a_{Des,mod,1}(n) & \cdots & a_{Des,mod,N_{FIR}-1}(n) \\ a_{Des,mod,1}(n) & a_{Des,mod,0}(n) & \cdots & a_{Des,mod,N_{FIR}-2}(n) \\ \vdots & \vdots & \ddots & \vdots \\ a_{Des,mod,N_{FIR}-1}(n) & a_{Des,mod,N_{FIR}-2}(n) & \cdots & a_{Des,mod,0}(n) \end{bmatrix}$$

and $$\tilde{a}_{DES,mod}(n) = [a_{Des,mod,1}(n), a_{Des,mod,2}(n), \ldots, a_{Des,mod,N_{FIR}}(n)]^T.$$

Figure 8:
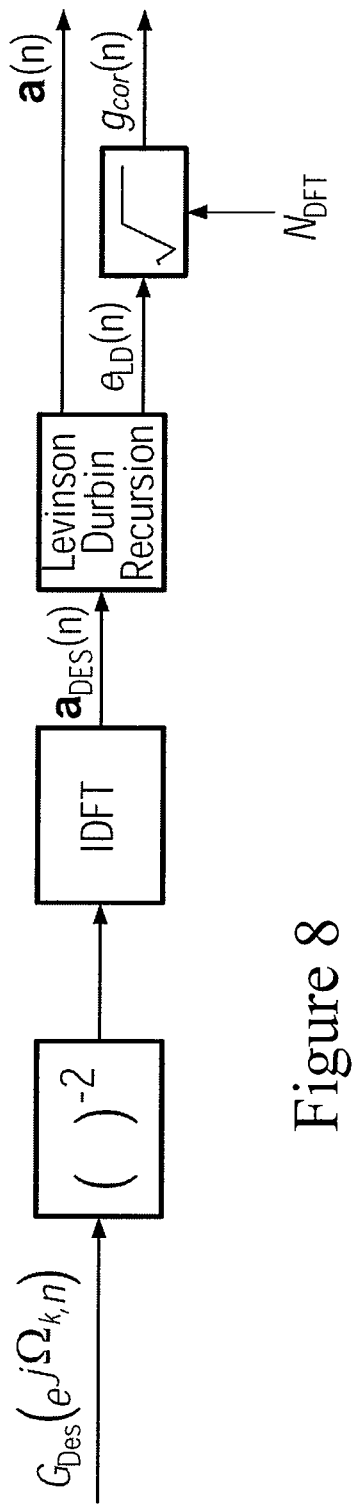
FIG. 8 is a process that adapts a spectral shaping filter.

In FIGS. 5 and 8, the above vector equation may be solved by the Levinson-Durbin recursion algorithm. The output of the FIR filter 506 may be enhanced by the correct gain $g_{cor}(n)$ provided by the shape control unit 504. As shown in FIG. 8, this may be achieved by using the energy of the residual signal $e_{LD}(n)$ obtained by the Levinson-Durbin recursion algorithm:

$$g_{cor}(n) = \sqrt{\frac{N_{DFT}}{e_{LD}(n)}}.$$

As described, an IIR filter may be used in place of the FIR filter 506 of FIG. 5. In this case, the inverse of the frequency response used for the FIR filter design may be used:

$$a_{Des,IIR}(n) = IDFT\{|G_{Des}(e^{j\Omega k}, n)|^2\}.$$

After carrying out the same computations described above but using the inverse frequency response $a_{Des,IIR}(n)$, an all-pole IIR filter results. The resulting filter may be used for shaping the received audio signal $x(n)$.

Employment of either an FIR filter or an IIR filter for the equalization of the received audio signal $x(n)$ exhibits different advantages. In one implementation, the IIR filter may be superior to the FIR filter in modeling small gain peaks. In another implementation, the FIR filter may be superior to the IIR filter in modeling attenuation peaks. Therefore, in some implementations, it may be preferred to model the desired spectral shape by both the IIR and the FIR filters and to compare the model results with each other and choose the better one for shaping.

When a Levinson-Durbin recursion algorithm is used, the prediction error power of the residual signal may be automatically obtained. Depending on the prediction error power on a frame by frame basis, the result of either the FIR filter or the IIR filter may be used for the subsequent processing, e.g., shaping. If the Levinson-Durbin recursion algorithm is not used, the respective prediction error powers of the residual signals may be calculated by:

$$e_{LD,FIR}(n) = a_{Des,0}(n) - \sum_{i=0}^{N_{FIR}-1} a_i(n) a_{Des,i+1}(n)$$

and $$e_{LD,IIR}(n) = a_{Des,IIR,0}(n) - \sum_{i=0}^{N_{IIR}-1} a_{HR,i}(n) a_{Des,IIR,i+1}(n).$$

The respective prediction error powers of the residual signals may be compared with each other for determining the best choice for each frame.

Figure 9:
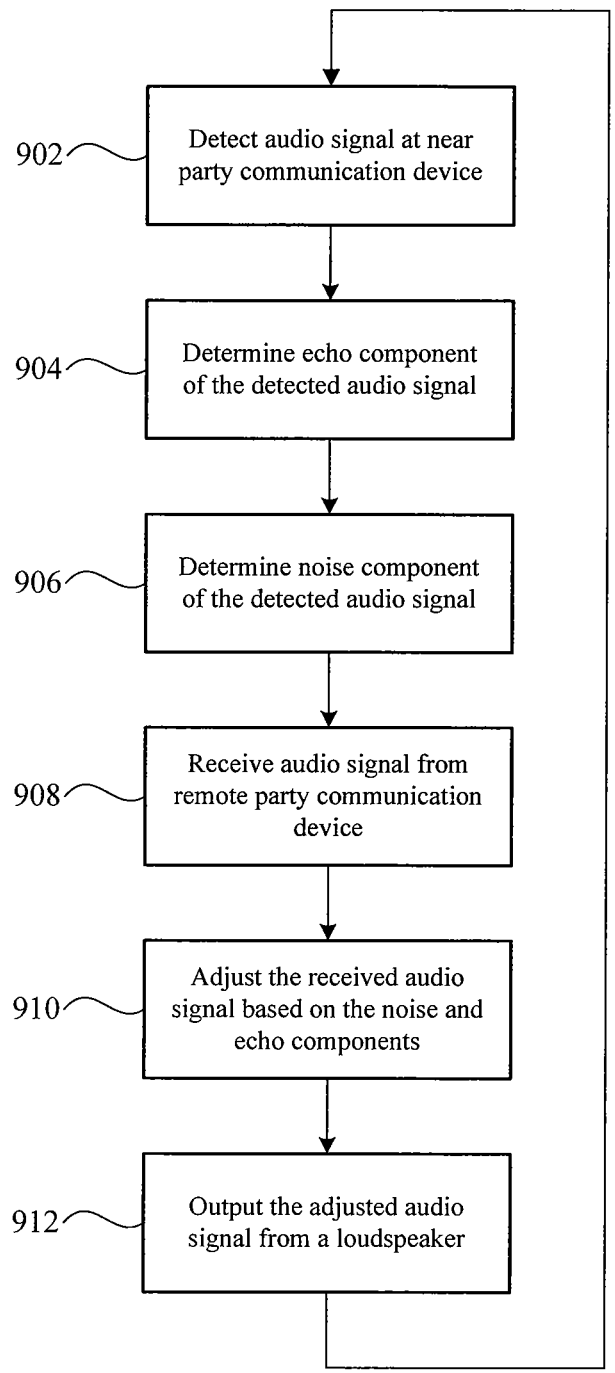
FIG. 9 is a process that adjusts a received audio signal based on a detected audio signal.

FIG. 9 is a process that adjusts a received audio signal based on the features of a detected audio signal. At act 902, an audio signal is detected at a near party communication device. The detected audio signal may comprise a microphone signal that contains a desired near party speech component, a background noise component, and/or an echo component due to a loudspeaker output.

At act 904, an echo component of the detected audio signal is estimated. At act 906, a noise component of the detected audio signal is estimated. At act 908, an audio signal is received from a remote party communication device. At act 910, the received audio signal may be adjusted based on the estimated noise and echo components. A gain and/or spectral shape of the audio signal may be adjusted based on the echo component alone or based on a combination of the echo component and the noise component.

At act 912, the adjusted audio signal may be output from a loudspeaker. When the audio detection device (e.g., microphone) detects another audio signal, the process may begin again at act 902. This detected signal may contain echo components due to the loudspeaker output of act 912, which may provide the basis to adjust a gain or spectral shape of subsequent audio signals received from the remote party communication device.

Figure 10:
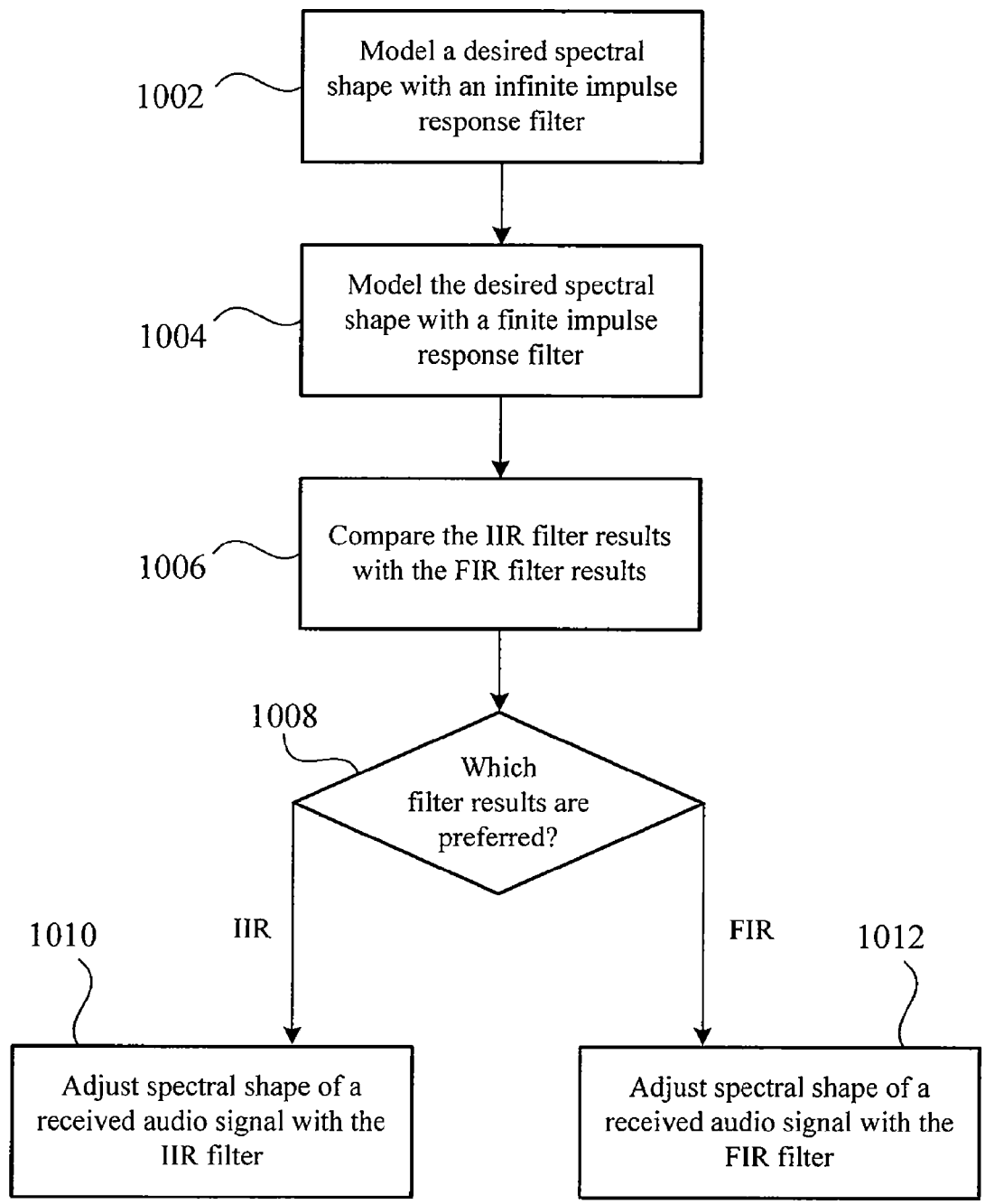
FIG. 10 is a process that selects a filter to adjust a spectral shape of a received audio signal.

FIG. 10 is a process that selects a filter to adjust a spectral shape of a received audio signal. The spectral shape of a received audio signal may be adjusted through equalization. Specifically, the frequency envelope of the received audio signal may be modified. In one implementation, the spectral shape adjustments may be performed by either an Infinite Impulse Response (IIR) filter or a Finite Impulse Response (FIR) filter. Both kinds of filters have individual advantages. Whereas finite impulse response (FIR) filters may be stable, since no feedback branch is provided, recursive infinite impulse response (IIR) filters may meet a given set of specifications with a lower filter order than a corresponding FIR filter. Efficient processing in terms of computational time may be achieved more readily by IIR filters, but these filters may suffer demand for permanent stability checks. In some applications, a small gain peak may be modeled better by an IIR filter than by an FIR filter. In other applications, a small attenuation peak may be modeled better by an FIR filter than by an IIR filter.

Thus, a desired spectral shape may be modeled by both an IIR filter and an FIR filter. At act 1002, a desired spectral shape is modeled with an IIR filter. At act 1004, the desired spectral shape is modeled with a FIR filter. At act 1006, the model results of both filters are compared. In one process, the model results are compared for each frame separately. At act 1008, one of the filters is selected for spectral shape processing. For example, the process may select the filter with the model result that better matches the desired spectral shape. In one process, the filters results may be compared for each frame. The IIR filter may be selected for some frames and the FIR filter may be selected for other frames. The filter with the model result that better matches the desired spectral shape may be used for adjusting the spectral shape of the received audio signal. At act 1010, the IIR filter is used to adjust the spectral shape of the received audio signal when the IIR filter is selected at act 1008. The spectral shape of the received audio signal may be adjusted by an IIR filter based on the Inverse Discrete Fourier Transform of the squared magnitude of the desired spectral shape. At act 1012, the FIR filter may adjust the spectral shape of the received audio signal when the FIR filter is selected at act 1008. The spectral shape of the received audio signal may be adjusted by a FIR filter based on the Inverse Discrete Fourier Transform of the inverse of the squared magnitude of the desired spectral shape.

Each of the processes described may be encoded in a computer readable medium such as a memory, programmed within a device such as one or more circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A computer-readable medium, machine-readable storage medium, propagated-signal medium, and/or signal-bearing medium may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM," a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for processing an audio signal, comprising:
   estimating an echo component of a microphone signal detected at a near party communication device;
   receiving an audio signal transmitted from a remote party communication device to the near party communication device;
   adjusting a gain of the received audio signal based on the echo component of the microphone signal; and
   adjusting a spectral shape of the received audio signal based on the echo component of the microphone signal by
      modeling a desired spectral shape with an infinite impulse response filter using at least the echo component to obtain a first model result;
      modeling the desired spectral shape with a finite impulse response filter using at least the echo component to obtain a second model result;
      comparing the first model result with the second model result;
      selecting the infinite impulse response filter to adjust a spectral shape of the received audio signal when the first model result is a better match for the desired spectral shape; and
      selecting the finite impulse response filter to adjust the spectral shape of the received audio signal when the second model result is a better match for the desired spectral shape.

2. The method of claim 1, where the act of adjusting the spectral shape further comprises modifying a frequency envelope of the received audio signal based on the echo component of the microphone signal.

3. The method of claim 1, where the echo component of the microphone signal is due to a loudspeaker output of an audio signal received from the remote party communication device.

4. The method of claim 1, where the near party communication device is associated with a microphone and a loudspeaker, where the act of estimating the echo component comprises analyzing the microphone signal to identify a portion of the microphone signal that is due to the loudspeaker outputting an audio signal received from the remote party communication device.

5. The method of claim 1, further comprising:
estimating a noise component of the microphone signal; and
where the act of adjusting the gain or spectral shape of the received audio signal is based on the echo component and the noise component of the microphone signal.

6. The method of claim 1, wherein adjusting all the spectral shape further comprises:
passing the received audio signal through the infinite impulse response filter to adjust the spectral shape of the received audio signal based on an inverse discrete Fourier transform of a squared magnitude of the desired spectral shape; or
passing the received audio signal through the finite impulse response fitter to adjust the spectral shape of the received audio signal based on an inverse discrete Fourier transform of an inverse of a squared magnitude of the desired spectral shape.

7. The method of claim 1, where the act of adjusting a gain or spectral shape of the received audio signal is based on an average peak echo-to-noise ratio of the microphone signal.

8. The method of claim 7, where the average peak echo-to-noise ratio is smoothed in frequency by an infinite impulse response filter.

9. A method for audio signal processing, comprising:
receiving an audio signal at a near party communication device that was transmitted from a remote party communication device;
estimating local background noise at the near party communication device;
estimating local acoustic echo at the near party communication device; and
adjusting a gain of the received audio signal based on the estimated local background noise and the estimated local acoustic echo; and
adjusting a spectral shape of the received audio signal based on the estimated local background noise and the estimated local acoustic echo by
obtaining a first model result using an infinite impulse response filter;
obtaining a second model result using a finite impulse response filter;
comparing the first model result with the second model result for each frame; and
for each frame, adjusting the spectral shape of the received audio signal based on the first model result or the second model result that better matches a desired spectral shape.

10. The method of claim 9, where the local acoustic echo is due to a loudspeaker output of an audio signal received from the remote party communication device.

11. The method of claim 9, where the spectral shape of the received audio signal is adjusted by the infinite impulse response filter based on an inverse discrete Fourier transform of a squared magnitude of the desired spectral shape or the finite impulse response filter based on an inverse discrete Fourier transform of an inverse of a squared magnitude of the desired spectral shape, 12. The method of claim 9, where the gain or spectral shape of the received audio signal is adjusted based on an average peak echo-to-noise ratio of the detected audio signal.

13. A signal processing system, comprising:
an echo compensation filter configured to filter an audio signal detected at a near party communication device and output an estimate of an echo component of the detected audio signal; and
a signal adjustment unit with a finite impulse response filter and an infinite impulse response filter, wherein the signal adjustment unit is coupled with the echo compensation filter and configured to receive an audio signal from a remote party communication device, adjust a gain of the received audio signal based on the echo component of the detected audio signal, and adjust a spectral shape of the received audio signal based on the echo component by
modeling a desired spectral shape with the infinite impulse response filter using at least the echo component to obtain a first model result;
modeling the desired, spectral shape with the finite impulse response filter using, at least the echo component to obtain a second model result; comparing the first model result with the second model result;
selecting the infinite impulse response filter to adjust the spectral shape of the received audio signal when the first model result is a better match for the desired spectral shape; and
selecting the finite impulse response filter to adjust the spectral shape of the received audio signal when the second model result is a better match for the desired spectral shape.

14. The system of claim 13, where the echo component of the detected audio signal is due to a loudspeaker output of an audio signal received from the remote party communication device.

15. The system of claim 13, further comprising
a noise reduction filter configured to filter the detected audio signal and output an estimate of a noise component of the detected audio signal; and where the signal adjustment unit is configured to adjust a gain or spectral shape of the received audio signal based on the echo component and the noise component of the detected audio signal.

16. The system of claim 13, where the signal adjustment unit is configured to adjust a gain or spectral shape of the received audio signal based on an average peak echo-to-noise ratio of the detected audio signal.

17. The system of claim 13, where the detected audio signal comprises a microphone signal, the system further comprising:
a first analysis filter bank configured to divide the microphone signal into microphone sub-band, signals;
a second analysis filter bank configured to divide a reference signal into reference sub-band signals to be input into the echo compensation filter to reduce echo in the microphone sub-band signals; and
a synthesis filter bank configured to synthesize the microphone sub-band signals filtered by the echo compensation filter.

18. The system of claim 13, further comprising a transmitter configured to transmit the detected audio signal filtered by the echo compensation filter to a remote party communication. device.

19. The system of claim 13, further comprising an amplifier, where the echo compensation filter is configured to receive a reference signal for adaptation of echo compensation filter coefficients either before or after amplification of the received audio signal processed by the signal adjustment unit.

20. A signal processing system, comprising:
a loudspeaker configured to output a loudspeaker signal;
a microphone configured to convert sound into an operational signal;

a noise reduction filter configured to filter the operational signal and output an estimate of noise;

an echo compensation fitter configured to filter the operational signal and output an estimate of echo; and a signal adjustment unit with a finite impulse response filter and an infinite impulse response filter, wherein the signal adjustment unit is in communication with the noise reduction filter and the echo compensation filter, where the signal adjustment unit is configured to receive an audio signal from a remote party communication device and adjust a spectral shape of the received audio signal based on the estimate of noise and the estimate of echo by modeling a desired spectral shape with the infinite impulse response filter using at least the echo component to obtain a first model result;

modeling the desired spectral shape with the finite impulse response filter using, at least the echo component to obtain a second model result;

comparing the first model result with the second model result;

selecting the infinite impulse response filter to adjust the spectral shape of the received audio signal when the first model result is a better match for the desired spectral shape; and selecting the finite impulse response filter to adjust the spectral shape of the receivedaudio signal when the second model result is a better match for the desired spectral shape.

21. The system of claim 20, where the echo in the operational signal is due to detection of the loudspeaker signal at the microphone, where the loudspeaker signal is based on an audio signal received from the remote party communication device.

22. The system of claim 20, where the microphone comprises a directional microphone of a microphone array, further comprising a beamformer configured to receive the operational signal from the microphone array and obtain a beamformed signal.

* * * * *